United States Patent
Nance et al.

(10) Patent No.: US 10,775,802 B2
(45) Date of Patent: Sep. 15, 2020

(54) SYSTEMS, DEVICES, AND METHODS FOR VEHICLE SPEED CONTROL

(71) Applicant: ATC Technologies, LLC, Reston, VA (US)

(72) Inventors: David Nance, Sterling, VA (US); Ilya Ziskind, Sterling, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 83 days.

(21) Appl. No.: 16/117,901

(22) Filed: Aug. 30, 2018

(65) Prior Publication Data
US 2019/0064833 A1 Feb. 28, 2019

Related U.S. Application Data

(60) Provisional application No. 62/552,051, filed on Aug. 30, 2017.

(51) Int. Cl.
| | | |
|---|---|---|
| G05D 1/02 | (2020.01) | |
| B60W 30/14 | (2006.01) | |
| B60W 10/04 | (2006.01) | |

(52) U.S. Cl.
CPC ........... *G05D 1/0223* (2013.01); *B60W 30/14* (2013.01); *G05D 1/0278* (2013.01); *B60W 10/04* (2013.01)

(58) Field of Classification Search
CPC ..... G05D 1/0278; B60W 10/04; B60W 30/14
See application file for complete search history.

(56) References Cited

U.S. PATENT DOCUMENTS

| | | | | |
|---|---|---|---|---|
| 2010/0057336 | A1* | 3/2010 | Levine | G01C 21/26 701/532 |
| 2012/0323474 | A1* | 12/2012 | Breed | B60W 30/16 701/117 |
| 2013/0190964 | A1* | 7/2013 | Uehara | G01C 21/3691 701/25 |
| 2013/0231854 | A1 | 9/2013 | Rovik et al. | |
| 2015/0120083 | A1* | 4/2015 | Gurovich | G07C 5/008 701/1 |

(Continued)

OTHER PUBLICATIONS

PCT/US2018/048864 International Search Report and Written Opinion dated Nov. 19, 2018 (11 pages).

*Primary Examiner* — Alan D Hutchinson
*Assistant Examiner* — Andy Schneider
(74) *Attorney, Agent, or Firm* — Michael Best & Friedrich LLP

(57) ABSTRACT

A network system for controlling a vehicle speed includes a server, a satellite, and a control device for monitoring and modifying a speed of the vehicle. The server receives information relating to at least one travel condition, calculates a target speed based on the at least one travel condition, and transmits one or more commands indicative of the target speed. The satellite is communicatively coupled to the server and receives the command(s) indicative of the target speed. The control device includes a speed sensor generating a signal indicative of a sensed vehicle speed, a receiver communicatively coupled to the satellite and receiving the command(s) indicative of the target speed, and a controller. The controller calculates a difference between the target speed and the sensed vehicle speed, and modifies operation of a prime mover and/or traction elements to cause the sensed vehicle speed to match the target speed.

19 Claims, 4 Drawing Sheets

(56) References Cited

U.S. PATENT DOCUMENTS

| | | | |
|---|---|---|---|
| 2015/0179066 A1* | 6/2015 | Rider | G08G 1/166 |
| | | | 701/31.5 |
| 2015/0197248 A1 | 7/2015 | Breed et al. | |
| 2016/0171278 A1* | 6/2016 | Ponder | G06K 9/0063 |
| | | | 382/104 |
| 2018/0186381 A1* | 7/2018 | Erlien | G05D 1/0278 |
| 2019/0064823 A1* | 2/2019 | Jiang | B60W 10/20 |

* cited by examiner

SYSTEMS, DEVICES, AND METHODS FOR VEHICLE SPEED CONTROL

REFERENCE TO RELATED APPLICATION

This application claims the benefit of prior-filed, U.S. Provisional Patent Application No. 62/552,051, filed Aug. 30, 2017, the entire contents of which are incorporated by reference.

TECHNICAL FIELD

The present disclosure generally relates to systems and methods for controlling a vehicle's speed.

SUMMARY

In one independent aspect, a method for controlling a speed of a vehicle includes: receiving information indicative of at least one travel condition; determining a target speed based on the information indicative of at least one travel condition; and transmitting a command indicative of the target speed to the vehicle via one or more satellites.

In another independent aspect, a network system is provided for controlling a speed of a vehicle including a prime mover and a plurality of traction elements. The system includes a server, a satellite, and a control device for monitoring and modifying a speed of the vehicle. The server is configured to receive information relating to at least one travel condition, calculate a target speed based on the at least one travel condition, and transmit at least one command indicative of the target speed. The satellite is communicatively coupled to the server and is configured to receive the at least one command indicative of the target speed. The control device includes a speed sensor configured to generate a signal indicative of a sensed vehicle speed, a receiver communicatively coupled to the satellite and receiving the at least one command indicative of the target speed, and a controller. The controller is configured to calculate a difference between the target speed and the sensed vehicle speed, and modify operation of at least one of the prime mover and the traction elements to cause the sensed vehicle speed to match the target speed.

In yet another independent aspect, a device is provided for controlling a speed of a vehicle including a prime mover and a plurality of traction elements. The device includes: a sensor configured to generate a signal indicative of a sensed vehicle speed; a receiver communicatively coupled to a satellite and configured to receive at least one command indicative of a target speed; and a controller. The controller is configured to calculate a difference between the target speed and the sensed vehicle speed, and modify operation of at least one of the prime mover and the traction elements to cause the sensed vehicle speed to match the target speed.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects of the invention may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

Figure 1:
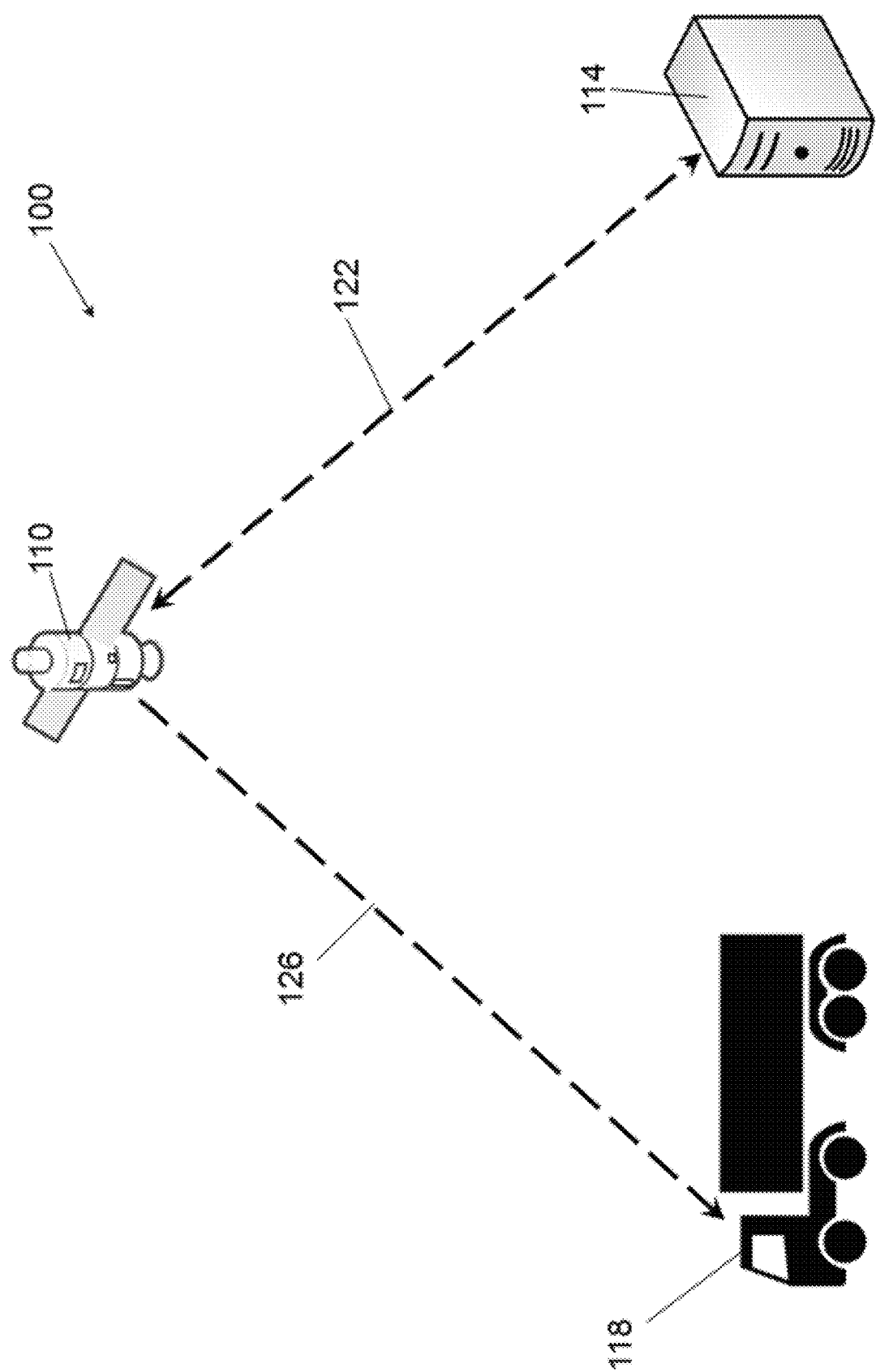
FIG. 1 is a diagram illustrating a network system.

FIG. 1 is a diagram of an example of a network system 100. The system 100 includes a satellite 110, a server 114, and a control system on a vehicle 118 (e.g., a tractor trailer). In the illustrated embodiment, the control system is locally mounted on-board the vehicle 118. It should be understood that the network system 100 is an example and, in some embodiments may include additional components. For example, the network system 100 can include multiple satellites, multiple servers, and multiple vehicles.

In the illustrated embodiment, the server 114 is communicatively coupled to the satellite 110 via a first communication link 122, while the control system of the vehicle 118 is communicatively coupled to the satellite 110 via a second communication link 126. In the illustrated embodiment, the first communication link 122 is a bi-directional wireless link, while the second communication link 126 is a uni-directional wireless link, providing one-way communication from the satellite 110 to the vehicle 118. In addition, in some embodiments the communication links 122, 126 are private and secure communication links, such as a link over a virtual private network. In other embodiments, the first communication link may also be uni-directional to provide one-way communication from the server 114 to the satellite 110. In other embodiments, both communication links may be bi-directional.

The satellite 110 can receive information from the server(s) 114 through the first communication link 122, and the satellite 110 transmits the information to the control system on the vehicle 118 through the second communication link 126. The information can include, for example, local maximum speed limits, restrictions imposed by governmental authorities and/or due to construction, accidents, emergency conditions, grade conditions of road surfaces, weather conditions, restrictions imposed on the operation of the vehicle (e.g., by an owner of the vehicle or fleet, or based on a given load carried by the vehicle). In some embodiments, the information could include a command or a set of commands for the control system of the vehicle to execute, based on an analysis of various conditions and parameters. The server 114 can compile information (such as those listed above) from one or more sources, such as weather information databases, global positioning system (GPS) satellites, and/or governmental authorities, etc. The server 114 can calculate a target "safe" speed based on an algorithm (e.g., by applying a weight factor to each parameter compiled from the various sources) and transmit speed control commands in real-time to facilitate efficient and safe operation of the vehicle(s) 118.

In one example, a vehicle 118 may be travelling on a road at a first speed. The server 114 may receive information regarding a travel hindrance (e.g., an accident or bad weather) affecting a section of the road that the vehicle 118 is approaching. In response, the server 114 may calculate a second speed that is less than the first speed and transmit a command to the satellite 110 via the first communication link 122, which then transmits the command to the vehicle 118 via the second communication link 126. The vehicle 118 reduces its speed to match the second speed. The server 114 may also receive information that the subsequent section of the road is clear of any travel hindrances. The server 114 can calculate a third speed that is greater than the second speed and transmit a command for vehicles 118 that have passed through the section of road affected by the travel hindrance. In response, after the vehicle 118 has passed through the section of the road that is affected by the travel hindrance, the vehicle 118 increases its speed to match the third speed.

The target speed could be different in different geographic regions, so the information transmitted from the server 114 may include a set of commands. In some embodiments, the satellite 110 may transmit a region-specific command to vehicles in each region. In other embodiments, the satellite 110 may transmit the entire set of commands, and the control system of the vehicle 118 may execute only the command that is applicable to the region in which the vehicle 118 is currently located. The satellite 110 can provide real-time information to the control system to facilitate efficient and safe operation of the vehicle.

In the illustrated embodiment, the vehicle 118 can obtain information regarding its location through other means, independent of the satellite 110 from which the vehicle 118 receives speed control commands. In other embodiments, the same satellite 110 or system of satellites 110 can provide both the speed control commands as well as global position information. Also, in embodiments in which the first communication link 122 is bi-directional, the server 114 can receive information from the satellite(s) 110. For example, the satellite 110 can provide information to the server 114 including, for example, weather conditions, accidents or emergency conditions, traffic/congestion conditions, and proximity to geographic boundaries (such as state or county lines, or boundaries between road surfaces that are substantially flat to road surfaces that are inclined or have a steeper grade), etc.

Figure 2:
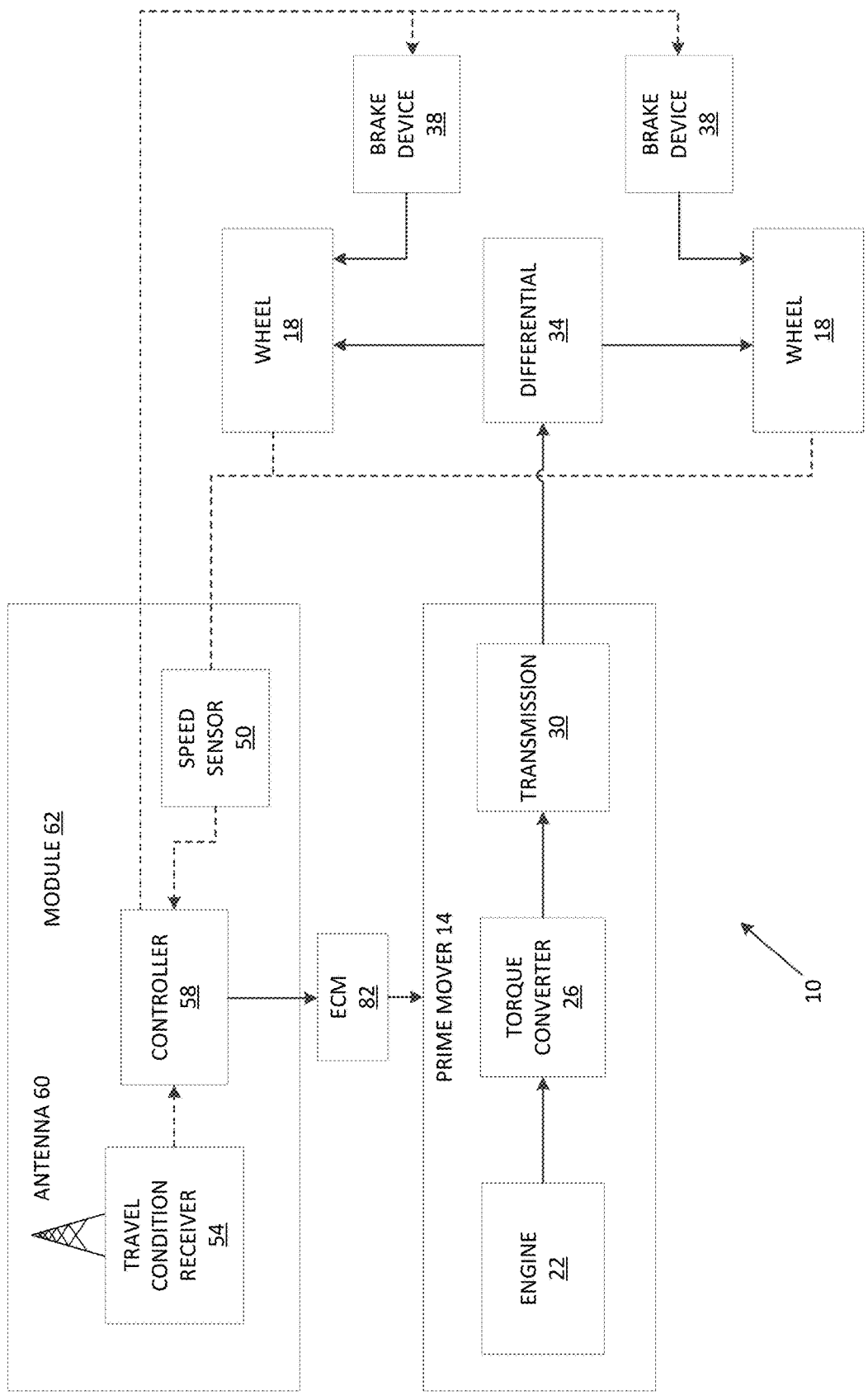
FIG. 2 is a diagram illustrating a drive train and a control system.

FIG. 2 illustrates a schematic of a drive train 10 for the vehicle 118. The drive train 10 includes a prime mover 14 and traction elements (e.g., wheels 18) that are mechanically driven by the prime mover 14. In the illustrated embodiment, the prime mover 14 includes an engine 22 (e.g., an internal combustion engine), a torque converter 26, and a transmission 30. The engine 22 converts an input source into mechanical energy that is transmitted through the torque converter 26 to the transmission 30. In the illustrated embodiment, the transmission 30 transmits the mechanical energy to the wheels 18 through a differential 34 to rotate the wheels 18 and move the vehicle over a surface. The vehicle 118 further includes brake devices 38, and each brake device 38 is coupled to an associated one of the wheels 18 to retard or slow rotation of the wheel 18. Although the schematic illustration includes two wheels 18 driven by the prime mover 14, it is understood that the drive train 10 may include fewer or more wheels 18. In addition, the vehicle 118 may include additional wheels that are not directly mechanically coupled to the prime mover 14.

Figure 3:
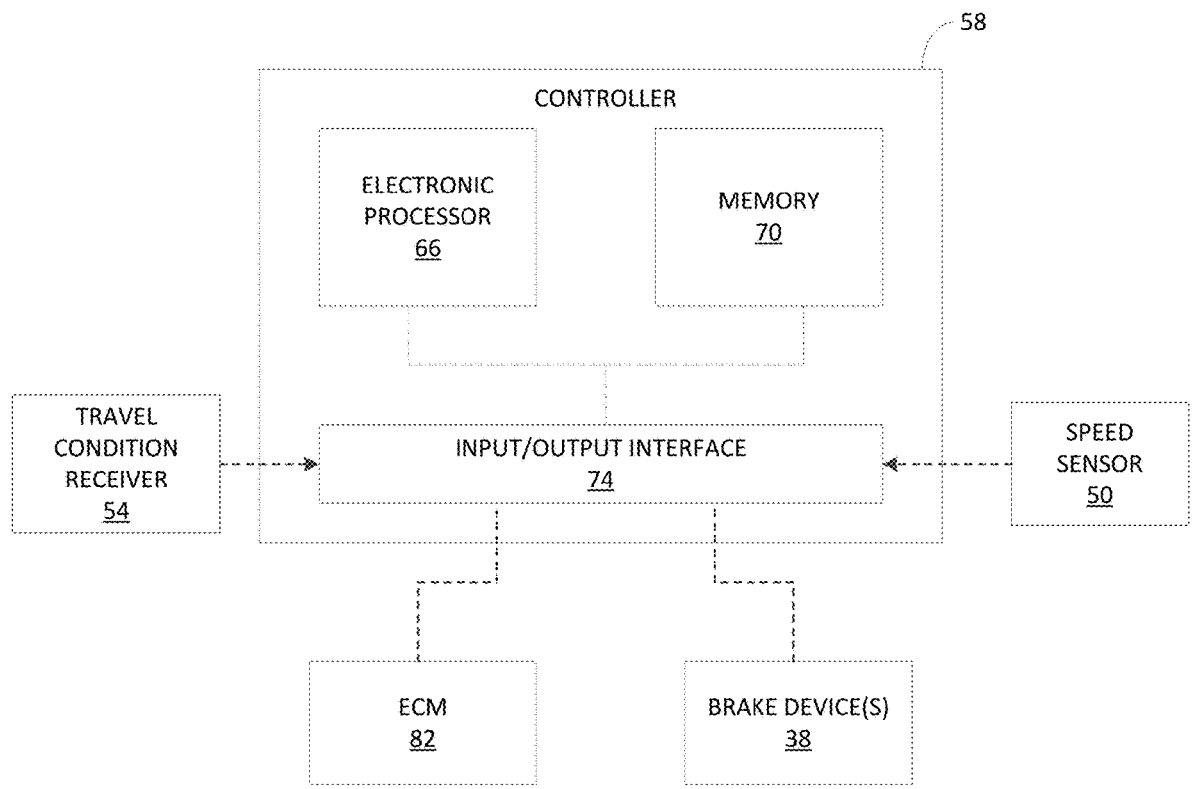
FIG. 3 is a diagram illustrating a control system.

Referring now to FIGS. 2 and 3, the control system includes a speed sensor 50, a travel condition receiver 54, and a controller 58. In some embodiments, the control system is provided on a module 62 that can be removably coupled to an Engine Control Module (ECM) 82. In the illustrated embodiment, the speed sensor 50 is in communication with at least one of the wheels 18 and detects a vehicle speed. The speed sensor 50 generates a first signal indicative of the vehicle speed and transmits it to the controller 58.

In the illustrated embodiment, the travel condition receiver 54 includes an antenna 60 in wireless communication with the satellite 110 (FIG. 1). The travel condition receiver 54 receives one or more commands from the satellite 110 indicating a target speed for the vehicle 118. The travel condition receiver 54 generates and transmits a second signal indicative of the command(s) to the controller 58. In some embodiments, the travel condition receiver 54 may communicate with the satellite 110, for example, through a data communications subsystem or satellite network.

As shown in FIG. 3, in the illustrated embodiment the controller 58 includes an electronic processor 66, a memory 70, and an input/output interface 74. The input/output interface 74 is operable to receive the first signal from the speed sensor 50 and the second signal from the travel condition receiver 54. In the illustrated embodiment, the controller 58 is also in communication with the prime mover 14 and/or the brake devices 38. As shown in FIG. 2, the controller 58 is in electrical communication with the ECM 82. For example, in some embodiments, the controller 58 is in communication with the engine 22, the transmission 30, and the brake devices 38. In other embodiments, the controller may be in communication with only one of these components. The controller 58 can determine whether and how to modify any operational characteristics of the vehicle 12 based on the second signal received from the travel condition receiver 54, and the controller 58 can modify the operation characteristics accordingly.

Figure 4:
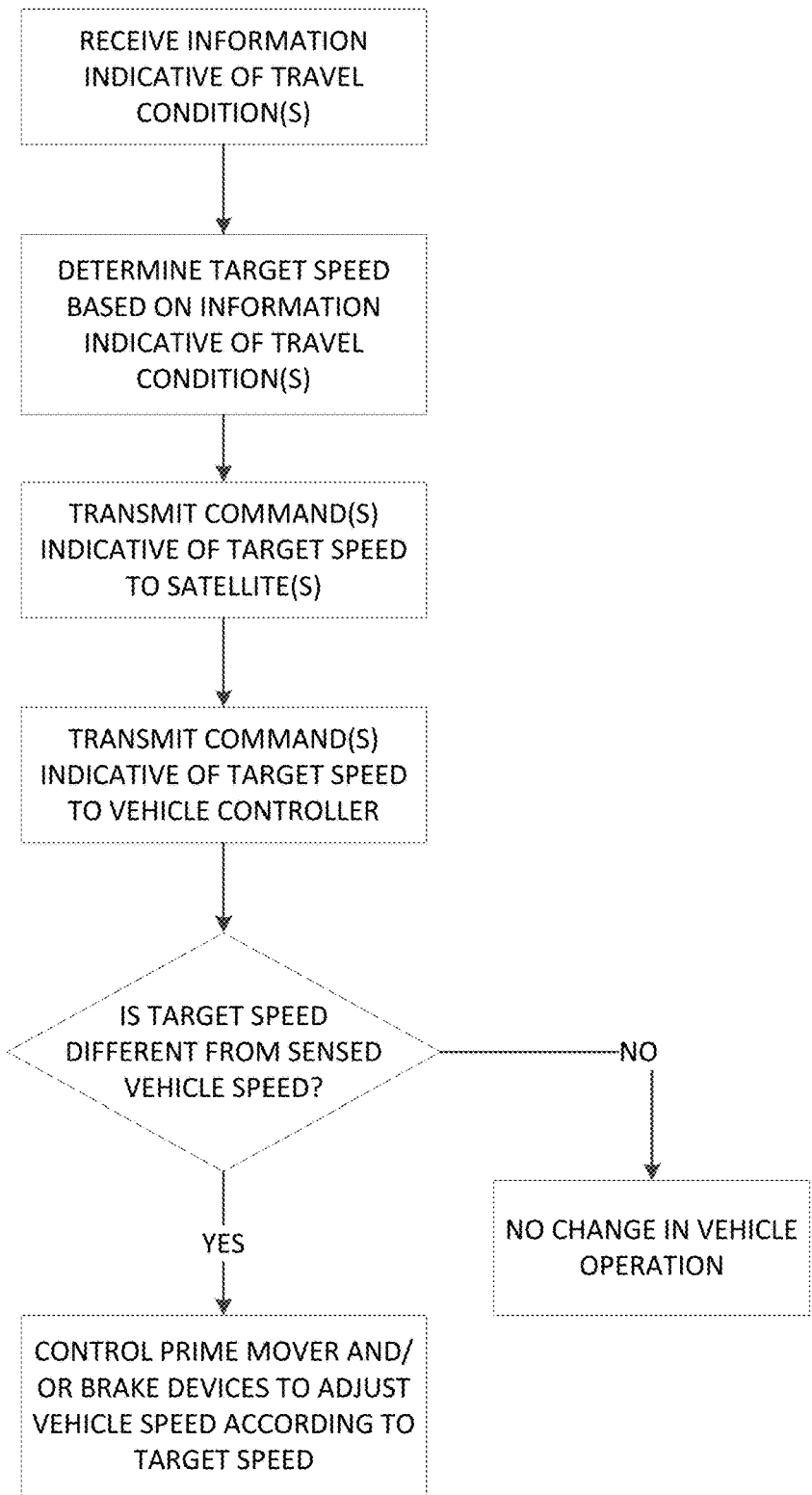
FIG. 4 is a flow diagram illustrating a process for controlling a vehicle speed.

FIG. 4 illustrates a flow diagram for dynamically controlling a vehicle speed. In some embodiments, the server 114 may receive and compile information from various sources. The server 114 then calculates a target travel speed. The server 114 transmits a command or set of commands indicative of the target travel speed to the satellite 110, which in turn transmits the command or set of commands to the vehicle 118. The command or set of commands is received by the travel condition receiver 54, which generates and transmits a second signal indicative of the command or set of commands to the controller 58.

The controller 58 can determine (e.g., calculate) a difference between the first signal indicating the actual vehicle speed and the target speed. The controller 58 then determines and executes an action to adjust the vehicle speed. For example, the controller 58 may send a signal to the ECM 82, which operates a fuel pump to limit or otherwise control a flow of fuel to the engine 22. In other embodiments, the controller 58 may control operation of the transmission 30, and/or the brake devices 38 to reduce the speed of the wheels 18. Alternatively, the controller 58 may actuate the engine 22 or the transmission 30 to accelerate or increase the speed of the wheels 18. In other embodiments, the controller may be in communication with the brake devices 38 only to reduce the vehicle speed as necessary. Also, in some embodiments, the controller 58 may execute an action to modify the vehicle speed if the difference between the actual vehicle speed and the target speed is greater than a predetermined threshold (for example, 1 mile per hour or 1 kilometer per hour).

Unlike static speed governors in which the maximum vehicle speed is constant in all conditions, the network system 100 provides dynamic control of the vehicle speed dependent on various external conditions to more efficiently move a vehicle over long distances. Rather than merely imposing a maximum speed limit, the network system 100 can identify a target vehicle speed that is calculated based on any number of parameters, which may be factored into the calculation of the target speed in different manners. The parameters may include, but are not limited to, a local speed limit, road surface conditions, accident or emergency conditions, traffic congestion conditions, any permanent or temporary restrictions by governmental authorities, operator guidelines/policies (e.g., restrictions imposed by an owner of the vehicle or fleet), proximity to geographical boundaries (e.g., geo-fencing), or weather conditions. Among other things, the network system 100 can also increase a speed of the vehicle, when warranted by the conditions, in order to maintain a more efficient traffic flow. The server 114 can aggregate a variety of inputs to determine a safe vehicle speed, thereby improving traffic flow/management, fuel consumption and engine efficiency, and delivery times. The server 114 transmits commands that may be implemented by the controller 58 based on the location of the vehicle 118.

Although various aspects have been described in detail with reference to certain preferred embodiments, variations and modifications exist within the scope and spirit of one or more independent aspects as described. Various features and advantages are set forth in the following claims.

What is claimed is:

1. A method for controlling a speed of a vehicle, the method comprising:
   receiving, at a server, information indicative of at least one travel condition in a geographic region;
   determining, at the server, a target speed based on the information indicative of at least one travel condition in the geographic region;
   transmitting a region-specific command indicative of the target speed to one or more satellites; and
   transmitting, via a uni-directional link, the region-specific command indicative of the target speed to the vehicle in the geographic region from the one or more satellites.

2. The method of claim 1, further comprising,
   receiving, with a receiver positioned on the vehicle, the command indicative of the target speed;
   determining, with an electronic processor positioned on the vehicle, a difference between the target speed and a sensed vehicle speed; and
   while the target speed is different from the sensed vehicle speed, sending a control signal to modify operation of at least one of a prime mover and a braking device to change the speed of the vehicle to match the target speed.

3. The method of claim 2, wherein determining a difference between the target speed and the sensed vehicle speed includes determining whether the difference is greater than a predetermined threshold, and wherein sending the control signal includes sending the control signal while the difference is greater than the predetermined threshold.

4. The method of claim 2, further comprising
   while the target speed is less than the sensed vehicle speed, actuating a braking device to slow an associated traction element, and
   while the target speed is greater than the sensed vehicle speed, actuating the prime mover to accelerate at least one traction element.

5. The method of claim 1, wherein receiving information indicative of at least one travel condition includes at least one of a speed limit, a weather condition, a traffic congestion condition, an accident, an emergency condition, a road surface condition, and proximity with respect to a geographic boundary.

6. The method of claim 2, wherein sending a control signal includes sending a control signal to an engine control module.

7. The method of claim 6, wherein sending a control signal to an engine control module causes the engine control module to control flow of fuel to an engine.

8. The method of claim 2, wherein sending a control signal includes sending a control signal to a plurality of brake devices, each of the brake devices associated with one of a plurality of traction elements, at least some of the traction elements being mechanically driven by the prime mover.

9. A network system for controlling a speed of a vehicle, the vehicle including a prime mover and a plurality of traction elements, the system comprising:
   a server configured to
      receive information relating to at least one travel condition in a geographic region,
      calculate a target speed based on the at least one travel condition in the geographic region, and
      transmit at least one region-specific command indicative of the target speed;
   a satellite communicatively coupled to the server and configured to receive the at least one command indicative of the target speed, the satellite communicatively coupled to the vehicle via a uni-directional link, the satellite configured to transmit the region-specific command indicative of the target speed to the vehicle in the geographic region; and
   a control device for monitoring and modifying a speed of the vehicle, the control device including,
      a speed sensor configured to generate a signal indicative of a sensed vehicle speed,
      a receiver communicatively coupled to the satellite and receiving the at least one command indicative of the target speed, and
      a controller configured to
         calculate a difference between the target speed and the sensed vehicle speed, and modify operation of at least one of the prime mover and the traction elements to cause the sensed vehicle speed to match the target speed.

10. The system of claim 9, wherein the at least one travel condition includes at least one of a speed limit, a weather condition, a traffic congestion condition, an accident, an emergency condition, a road surface condition, and proximity with respect to a geographic boundary.

11. The system of claim 9, wherein
while the target speed is less than the sensed vehicle speed, the controller actuates a braking device to slow the traction elements, and
while the target speed is greater than the sensed vehicle speed, the controller actuates the prime mover to accelerate the traction elements.

12. The system of claim 9, wherein the controller is in communication with an engine control module configured to adjust at least one of an operation of a transmission and a flow of fuel to a fuel injector.

13. The system of claim 9, wherein the controller is in communication with a plurality of brake devices, each of the brake devices associated with one of the traction elements.

14. The system of claim 9, wherein the controller is configured to modify operation of at least one of the prime mover and the traction elements when the difference between the target speed and the sensed vehicle speed is greater than a predetermined threshold.

15. A device for controlling a speed of a vehicle, the vehicle including a prime mover and a plurality of traction elements, the device comprising:
a sensor configured to generate a signal indicative of a sensed vehicle speed;
a receiver communicatively coupled to a satellite by a uni-directional link, the receiver configured to receive at least one command indicative of a target speed associated with a geographic region while the vehicle is located within the associated geographic region; and
a controller configured to
calculate a difference between the target speed and the sensed vehicle speed, and
modify operation of at least one of the prime mover and the traction elements to cause the sensed vehicle speed to match the target speed.

16. The device of claim 15, wherein the device is removably connectable to an engine control module configured to control operation of an engine.

17. The device of claim 15, wherein the device is configured to control operation of one or more brake devices, each of the brake devices associated with one of the traction elements.

18. The device of claim 15, wherein the command indicative of a target speed is based on at least one travel condition that includes at least one of a speed limit, a weather condition, a traffic congestion condition, an accident, an emergency condition, a road surface condition, and proximity with respect to a geographic boundary.

19. The device of claim 15, wherein,
while the target speed is less than the sensed vehicle speed, the controller actuates a braking device to slow the traction elements, and
while the target speed is greater than the sensed vehicle speed, the controller actuates the prime mover to accelerate the traction elements.

* * * * *